(12) United States Patent
Maghrebi et al.

(10) Patent No.: US 10,862,669 B2
(45) Date of Patent: Dec. 8, 2020

(54) ENCRYPTION/DESCRIPTION METHOD PROTECTED AGAINST SIDE-CHANNEL ATTACKS

(71) Applicant: Safran Identity & Security, Issy-les-Moulineaux (FR)

(72) Inventors: Houssem Maghrebi, Issy les Moulineaux (FR); Guillaume Dabosville, Issy les Moulineaux (FR); Emmanuel Prouff, Issy les Moulineaux (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 402 days.

(21) Appl. No.: 15/709,982

(22) Filed: Sep. 20, 2017

(65) Prior Publication Data

US 2018/0083769 A1 Mar. 22, 2018

(30) Foreign Application Priority Data

Sep. 21, 2016 (FR) ...................................... 16 58874

(51) Int. Cl.
*H04L 9/00* (2006.01)
*H04L 9/06* (2006.01)
*G06F 21/62* (2013.01)

(52) U.S. Cl.
CPC .......... *H04L 9/002* (2013.01); *G06F 21/6227* (2013.01); *H04L 9/0618* (2013.01);
(Continued)

(58) Field of Classification Search
CPC ..................................................... H04L 9/002
(Continued)

(56) References Cited

U.S. PATENT DOCUMENTS

| 7,848,515 B2* | 12/2010 | Dupaquis | H04L 9/0625 380/255 |
| 8,184,806 B2* | 5/2012 | Gebotys | H04L 9/003 380/268 |
| 2011/0103584 A1* | 5/2011 | Liardet | H04L 9/004 380/255 |

FOREIGN PATENT DOCUMENTS

| EP | 1587237 A1 | 10/2005 |
| EP | 2675103 A2 | 12/2013 |

OTHER PUBLICATIONS

Preliminary Research Report received for French Application No. 1658874, dated May 10, 2017, 2 pages of original document Only.
(Continued)

*Primary Examiner* — Christopher J Brown
(74) *Attorney, Agent, or Firm* — Womble Bond Dickinson (US) LLP

(57) ABSTRACT

The present invention relates to a method for encryption or decryption of a data block from a secret key, wherein the method comprises: generating a first round key $k_r$ dependent on the secret key, selecting each of a first mask $(-b_r)$ and a second mask $(-b_{r+1})$ in a set consisting of a mask of bits all at one and a mask of all zero bits, calculating a first masked key $k_r'$ from the first round key $k_r$ and the first mask $(-b_r)$ as follows:

$$k_r' = k_r \oplus (-b_r)$$

wherein $\oplus$ is an exclusive disjunction, executing a first encryption round applied to two first data dependent on the data block, by means of the first masked round key $k_r'$ so as to produce two second data, after producing the first masked key $k_r'$, generating a second round key $k_{r+1}$ dependent on the secret key, calculating a second masked key $k_{r+1}'$ from the second round key $k_{r+1}$ and the second mask $(-b_{r+1})$ as follows: $k_{r+1}' = k_{r+1} \oplus (-b_{r+1})$, calculating two third data $L_r^{b_{r+1}}, R_r^{b_{r+1}}$ as follows:

(Continued)

$$R_r^{b_{r+1}} = R_r^{b_r} \oplus (-b_{r-1}) \oplus (-b_r)$$

$$L_r^{b_{r+1}} = L_r^{b_r} \oplus (-b_{r-1}) \oplus (-b_r)$$

and executing a second encryption round following the first encryption round, wherein the second encryption round is applied to the two third data $L_r^{b_{r+1}}$, $R_r^{b_{r+1}}$ by means of the second masked round key $k_{r+1}'$.

10 Claims, 3 Drawing Sheets

(52) U.S. Cl.
CPC .... *H04L 9/0625* (2013.01); *G06F 2207/7242* (2013.01); *H04L 2209/046* (2013.01)

(58) Field of Classification Search
USPC .......................................................... 380/28
See application file for complete search history.

(56) References Cited

OTHER PUBLICATIONS

European Search Report received for EP Patent Application No. 17192283.4, dated Jan. 17, 2018, 2 pages of Original Document Only.

\* cited by examiner

ENCRYPTION/DESCRIPTION METHOD PROTECTED AGAINST SIDE-CHANNEL ATTACKS

FIELD OF THE INVENTION

The present invention relates to the field of symmetric block encryption methods.

PRIOR ART

The DES encryption method ("Data Encryption Standard") is a known method of symmetric block encryption using a secret key. The TDES ("triple DES") encryption method comprising several DES encryption is also known.

DES encryption is executed in several rounds, each round using a round key.

The round keys are generated from the secret key during key schedule.

Each round key is generated during a round to encrypt data which depend on an input data block to be encrypted or decrypted.

Such an encryption method may be implemented in a device in several ways.

In a first implementation, all the round keys are calculated before the encryption rounds are executed.

In a second implementation, consuming less memory, the round keys are calculated "on demand". According to this second implementation, a round key $k_r$ is generated before its use during an encryption round of index r, then a following key $k_{r+1}$ is generated before its use during a following encryption round of index r+1.

A device executing a DES encryption or decryption method may be subject to physical attacks called side-channel attacks. A side-channel attack consists of monitoring the physical behavior of the device (power consumption, electromagnetic radiation, etc. . . . ) during execution of an algorithm embedded in the device. The resulting information by such monitoring may be exploited hereinbelow to determine the secret key used during DES encryption or decryption.

It is quite possible, in the case of the second implementation, that the two keys $k_r$ and $k_{r+1}$ are successively intercepted by an attacker, for example when these data move successively through the same physical zone of the device (a special memory registry used by the algorithm executing the encryption rounds, wires of a communication bus via which signals conveying the round keys, etc. transit). The attacker may observe the Hamming distance between the keys $k_r$ and $k_{r+1}$. This distance is equal to the number of bits of value 1 in the result of the exclusive disjunction (XOR operation) of the two keys, this result being conventionally noted $(k_r \oplus k_{r+1})$, and help him determine the secret key.

To protect a device executing DES encryption or decryption, it has been proposed to mask each round key produced by the key schedule by means a predetermined mask M.

The mask M used is the same for all the round keys.

The respective maskings of the round keys $k_r$ and $k_{r+1}$ are performed via the following calculations:

$$k_r' = k_r \oplus M$$

$$k_{r+1}' = k_{r+1} \oplus M$$

But such masking does not effectively protect a device running DES encryption according to the second implementation.

In fact, the equalities following are verified during execution of the masking of the round keys $k_r$ and $k_{r+1}$ by means of the mask M:

$$HD(k_r', k_{r+1}') = HD(k_r, k_{r+1}) = k_r \oplus M \oplus k_{r+1} \oplus M = k_r \oplus k_{r+1}$$

where HD(x, y) is the Hamming distance between x and y.

In this way, the proposed masking absolutely does not change the Hamming distance observable by an attacker between the keys $k_r$ and $k_{r+1}$.

It is also known to implement some DES encryption methods such that they respect the following property:

$$B' = DES(B, K)$$

$$\overline{B'} = DES(\overline{B}, \overline{K})$$

i.e., if the DES encryption of a data block B by means of the secret key K producing the output block B', then the DES encryption of the complement to a $\overline{B}$ of the data block B by means of the complement to a $\overline{K}$ of the secret key K produces the complement to a $\overline{B'}$ of the output block B'. This property defends the device executing DES encryption against side-channel attacks of "safe-error" type.

Yet this property proves ineffective in protecting DES encryption against side-channel attacks of the template type ("template attacks"). In fact, the use of a key complemented or not throughout a DES encryption does not always prevent showing such an attack since:

$$HD(\overline{k_r}, \overline{k_{r+1}}) = HD(k_r, k_{r+1}) = k_r \oplus (1 \ldots 1) \oplus k_{r+1} \oplus (1 \ldots 1) = k_r \oplus k_{r+1}$$

DESCRIPTION OF THE INVENTION

A goal of the invention is to reinforce the protection of an encryption/decryption method comprising the calculation of round keys "on demand" against side-channel attacks.

Therefore a method for encrypting or decrypting a data block from a secret key is proposed, the method comprising steps of:

generating a first round key $k_r$ dependent on the secret key, selecting each of a first mask $(-b_r)$ and a second mask $(-b_{r+1})$ in a set consisting of a mask of bits all at one and a mask of all zero bits, calculating a first masked key $k_r'$ from the first round key $k_r$ and the first mask $(-b_r)$ as follows:

$$k_r' = k_r \oplus (-b_r)$$

wherein $\oplus$ is an exclusive disjunction, executing a first encryption round applied to two first data dependent on the data block, by means of the first masked round key $k_r'$ so as to produce two second data, after producing the first masked key $k_r'$, generating a second round key $k_{r+1}$ dependent on the secret key, calculating a second masked key $k_{r+1}'$ from the second round key $k_{r+1}$ and the second mask $(-b_{r+1})$ as follows:

$$k_{r+1}' = k_{r+1} \oplus (-b_{r+1})$$

calculating two third data $L_r^{b_{r+1}}$, $R_r^{b_{r+1}}$ as follows $$R_r^{b_{r+1}} = R_r^{b_r} \oplus (-b_{r-1}) \oplus (-b_r)$$

$$L_r^{b_{r+1}} = L_r^{b_r} \oplus (-b_{r-1}) \oplus (-b_r)$$

executing a second encryption round following the first encryption round, wherein the second encryption round is applied to the two third data $L_r^{b_{r+1}}$, $R_r^{b_{r+1}}$ by means of the second masked round key $k_{r+1}'$.

As the first mask can be either the mask of bits all at one or the mask of all zero bits and the second mask can be either the mask of bits all at one or the mask of all zero bits, four different modifications in round key value may occur between the two encryption rounds.

An attacker probing the differences between the first round key and the second round key generated later is faced with uncertainty preventing him from determining whether, between the two rounds, the change in value of bit having rank j results from the difference between the bit having rank j of the first round key and between the bit having rank j of the second round key, or whether it results from the difference between the first mask and the second mask. The attacker therefore cannot deduce information letting him guess the round keys and consequently the secret key K on which they depend, by observing the differences between the successively generated round keys.

Also, the calculation of the two third data carried out between the two encryption rounds forms a correction so as to adapt the encryption rounds to the masked round keys by means of the first and second masks.

The method may also be completed by way of the following optional characteristics, taken singly or in combination when this is technically possible.

The method may comprise generating a plurality of round keys, and comprise a plurality of successive encryption rounds, a round key being generated before each encryption round, and wherein:
for each round key generated,
a mask associated with the round key is selected, and
the exclusive disjunction of the round key and of the associated mask is calculated so as to produce a masked key,
the correction is performed between each pair of successive encryption rounds.

The selection of at least a—or each—mask may be performed before the plurality of encryption rounds and/or before the generation of the plurality of round keys.

The selection is for example random.

The selection may be adapted so that the mask of bits all at one and the mask of all zero bits are selected equiprobably.

The method may also comprise the generation of a number having a plurality of bits, each round key being associated with one of the bits, and wherein the mask selected to mask a round key is:
the mask of bits all at one if the bit associated with the round key has a first value,
the mask of all zero bits if the bit associated with the round key has a second value different to the first value.

The encryption round applied to the two first data may further comprise:
application of an encryption function to one of the two first data by means of the first masked round key so as to produce an intermediate datum, the first datum also forming one of the two second data,
calculation of the exclusive disjunction of the intermediate datum and of the other first datum so as to produce the other second datum.

According to a second aspect of the invention, a computer program product is further proposed comprising program code instructions for execution of the steps of the preceding method, when this program is executed by at least one processor.

According to a third aspect of the invention, a device for encryption or decryption of a data block from a secret key is also proposed, the device comprising at least one processor configured to:
generate a first round key dependent on the secret key,
calculate the exclusive disjunction of the first round key and a first mask so as to generate a first round key $k_r$ dependent on the secret key,
select each of a first mask ($-b_r$) and a second mask ($-b_{r+1}$) in a set consisting of a mask of bits all at one and a mask of all zero bits,
calculate a first masked key $k_r'$ from the first round key $k_r$ and the first mask ($-b_r$) as follows:

$$k_r'=k_r\oplus(-b_r)$$

wherein $\oplus$ is a XOR operator,
execute an encryption round applied to two first data dependent on the data block, by means of the first masked round key $k_r'$ so as to produce two second data,
after producing the first masked key $k_r'$, generate a second round key $k_{r+1}$ dependent on the secret key, calculate a second masked key $k_{r+1}'$ from the second round key $k_{r+1}$ and the second mask ($-b_{r+1}$) as follows:

$$k_{r+1}'=k_{r+1}\oplus(-b_{r+1})$$

calculate two third data $L_r^{b_{r+1}}$, $R_r^{b_{r+1}}$ as follows $$R_r^{b_{r+1}}=R_r^{b_r}\oplus(-b_{r-1})\oplus(-b_r)$$

$$L_r^{b_{r+1}}=L_r^{b_r}\oplus(-b_{r-1})\oplus(-b_r)$$

execute a following encryption round applied to the two third data $L_r^{b_{r+1}}$, $R_r^{b_{r+1}}$ by means of the second masked round key ($k_{r+1}'$).

The encryption or decryption device according to the third aspect of the invention may be housed in a smart card.

DESCRIPTION OF THE FIGURES

Other characteristics, aims and advantages of the invention will emerge from the following description which is purely illustrative and non-limiting and which must be considered with respect to the appended drawings, wherein.

In all figures, similar elements bear identical reference numerals.

DETAILED DESCRIPTION OF THE INVENTION

Figure 1:
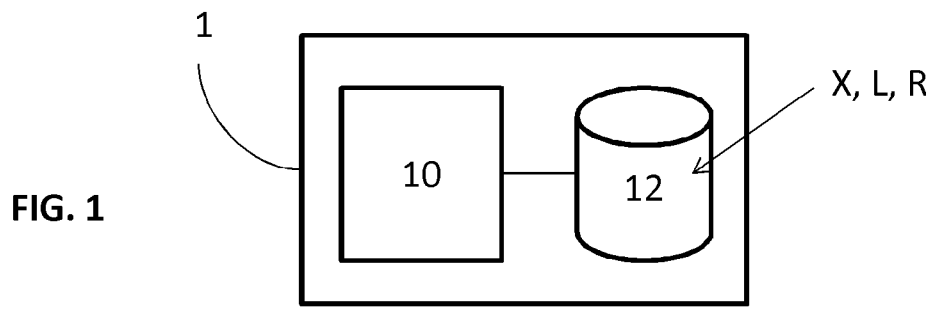
FIG. 1 schematically illustrates an encryption or decryption device.

In reference to FIG. 1, an encryption device 1 comprises at least one processor 10 and at least one memory 12.

The processor 10 is configured to execute a symmetric block encryption program.

The memory 12 is configured to store data used by this program.

In particular, the memory 12 comprises a non-volatile memory unit which stores data to be used during each execution of the program. These data especially comprise two permutation tables PC1 and PC2.

The non-volatile memory unit is of HDD, SSD, Flash type, etc.

The memory 12 also comprises a volatile memory unit (for example of RAM type). The purpose of the volatile memory unit is to temporarily store data generated by the processor 10.

The volatile memory unit especially comprises three memory registries: a first registry X, a left registry L, and a right registry R.

For example, the encryption device 1 is a smart card, a smart card component, or it comprises a smart card (bank card, etc.).

Figure 2:
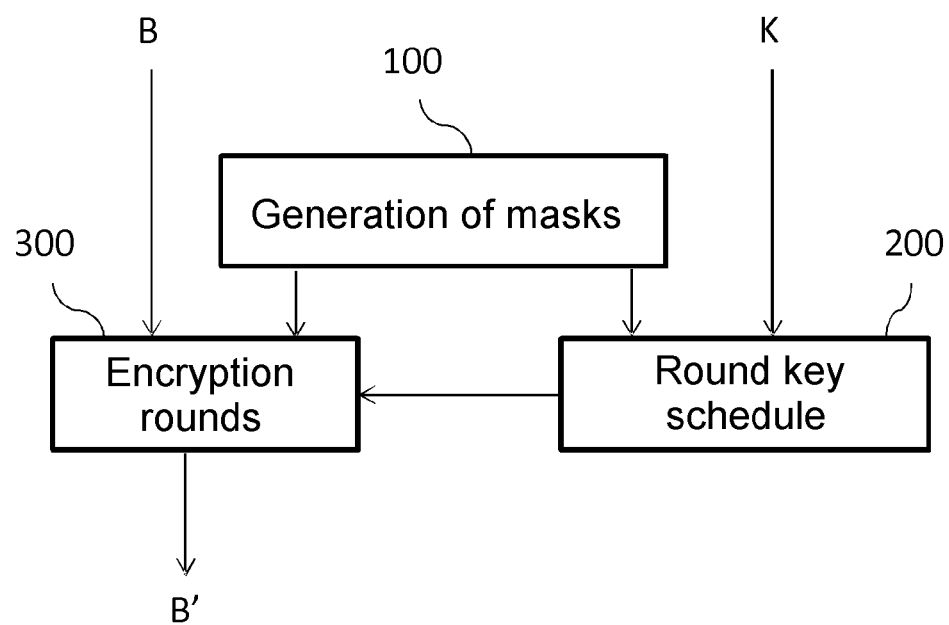
FIGS. 2, 3 and 4 schematically illustrate steps of an encryption or decryption method, according to an embodiment of the invention.

In reference to FIG. 2, a DES encryption method comprises the following steps.

The encryption method inputs a data block B to be encrypted and a secret key K and produces an encrypted data block B'.

The processor 10 conventionally executes:
 a key schedule 200 generating n round keys $k_1, \ldots, k_r, \ldots, k_n$ from the secret key K;
 a succession of n encryption rounds 300, each round using one of the generated round keys.

Masks Selection

Also, non-conventionally, two predetermined binary masks are stored in the non-volatile unit of the memory 12: a mask whereof the bits are all of value 1, called "all-at-1" mask, and a binary mask whereof all the bits are zero, called zero mask.

Each of the two binary masks has a number of bits equal to the number of bits of the block B to be encrypted.

In a step 100, the processor 10 selects n binary masks from the two predetermined binary masks, the selected masks being noted $(b_1), \ldots, (-b_r), \ldots, (-b_n)$. In other words, each binary mask $(-b_r)$ is either the "all-at-1" mask or the zero mask.

As will be evident below, the binary mask $(-b_r)$ is associated with the round key $k_r$.

Each binary mask $(-b_r)$ is selected randomly, for example according to a uniform law such that each of the two "all-at-1" and zero masks are equiprobable.

The selection 100 of the binary masks is preferably conducted before the succession of encryption rounds 300 and/or before the key schedule 200 generating the n round keys.

For example, the selection 100 of the binary masks comprises a query by the processor to a function which randomly draws a number having at least n bits. Each bit of the drawn number is associated with one of the round keys: the r-ith bit starting from the right (or left) of the drawn number, noted $b_r$, is for example associated with the key $k_r$.

When the mask $(-b_r)$ is to be used in a calculation, the processor reads the value of the bit $b_r$ of the number which has been drawn previously. As a function of this value, the processor loads the mask "all-at-1" or the zero mask which are pre-stored. For example:
 the processor loads the mask "all-at-1" if $b_r=1$, and
 the processor loads the zero mask if $b_r=0$,
or vice-versa.

With such a selection method it is unnecessary to store the n masks selected in addition to the mask "all-at-1" and the zero mask. Only the number of n bits drawn randomly is to be stored, which enables memory consumption economy.

Of course, other methods are possible for generating each binary mask $(-b_r)$. According to one of them, the processor 10 generates the mask $(-b_r)$ by calculating the result of $b_r-1$. If $b_r$ is zero the processor 10 obtains $-1=11111111$ (on an octet) in signed representation, and therefore the binary mask of bits all-at-1, and if $b_r$ is 1 then the processor 10 obtains $0=00000000$ (on an octet), therefore the zero binary mask.

Round Keys Schedule

Figure 3:
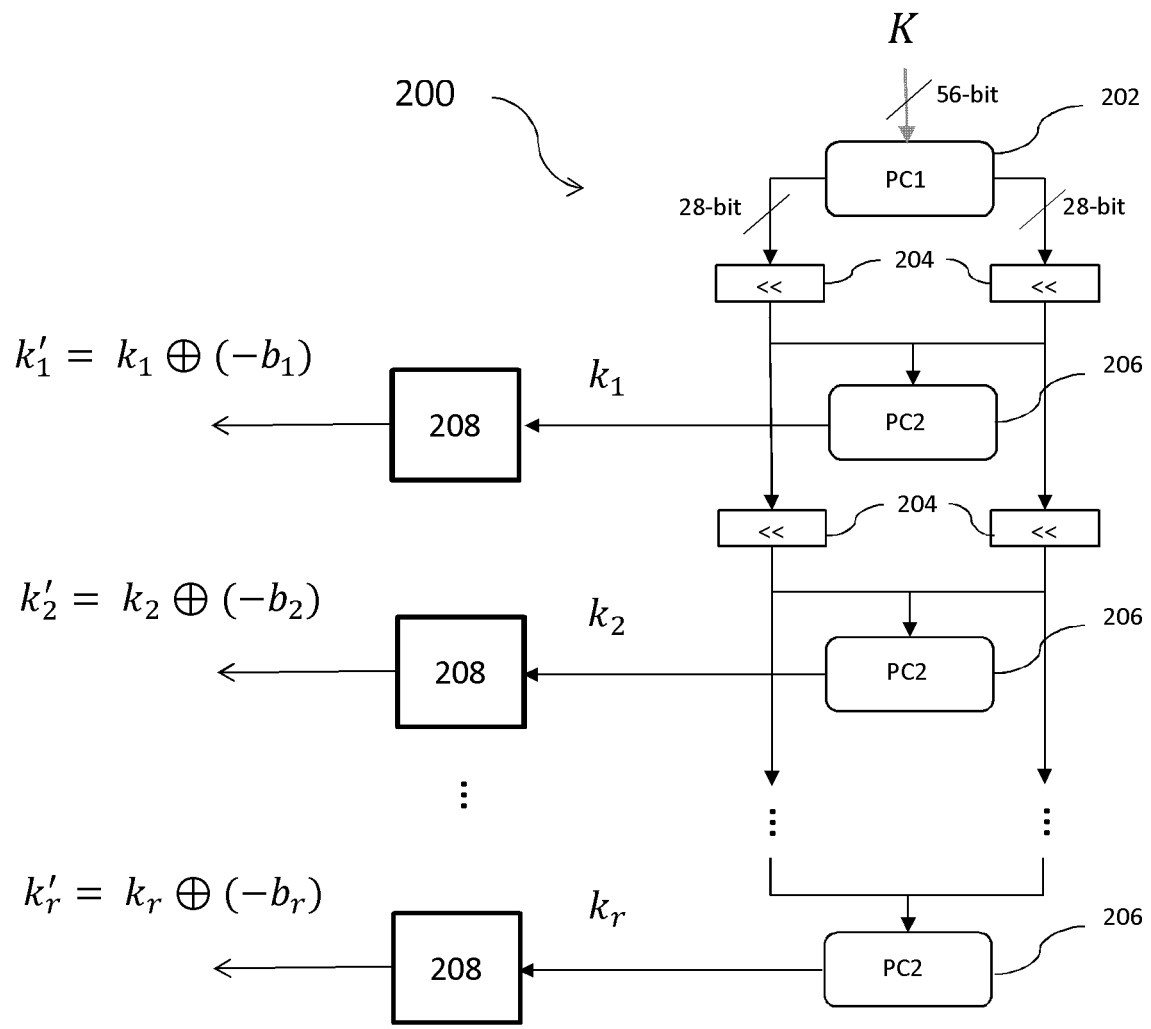

In reference to FIG. 3, the key schedule 200 comprises the following steps.

In a step 202, the processor 10 executes permutation on at least one portion of the secret key K, and this by means of the first permutation table PC1.

The secret key K has typically 64 bits including 56 base bits contributing entropy to the secret key K and 8 additional redundancy bits not contributing entropy to the secret key K. The portion of the key K subject to the permutation 100 is formed by the 56 base bits, and permutation 100 produces binary data having a cumulative length of 56 bits also.

The result of permutation 202 is split into two initial binary data: most significant 28 bits of this result and least significant 28 bits of this result.

The method then executes a plurality of iterations, each iteration producing a round key.

The iteration of index r producing the key $k_r$ comprises the following steps.

In a step 204, the processor 10 performs rotation applied to initial data which depend on the secret key K so as to produce two binary data offset by a certain number of bits (for example rotation to the left).

In the first iteration, the data to which rotation is applied are the binary data produced by the permutation 202. In a reference iteration of index r which is not the first iteration, the initial data are produced by the iteration of index r−1 preceding the reference iteration of index r.

In a step 206, the processor 10 swaps the offset binary data by means of the table PC2 so as to produce the round key $k_r$. More precisely, permutation 104 is executed on the concatenation of the two offset binary data.

The round key $k_r$ is for example stored in the first memory registry X, this registry being common to all iterations.

In a step 106, the processor 10 executes masking 208 of the round key. This masking 208 is done by calculating the exclusive disjunction of the round key $k_r$ and of the selected mask $(-b_r)$. The result $k_r \oplus (-b_r)$ of this masking 208 constitutes a masked key 14.

The masked key $k_r'$ is for example stored in the first memory registry X in place of the round key $k_r$.

Steps 204, 206, 208 are repeated during each iteration of the key schedule 200. The data to which the rotation step 204 of an iteration not being the first iteration is applied are executed on the data offset during the preceding iteration.

DES Encryption Rounds

Figure 4:
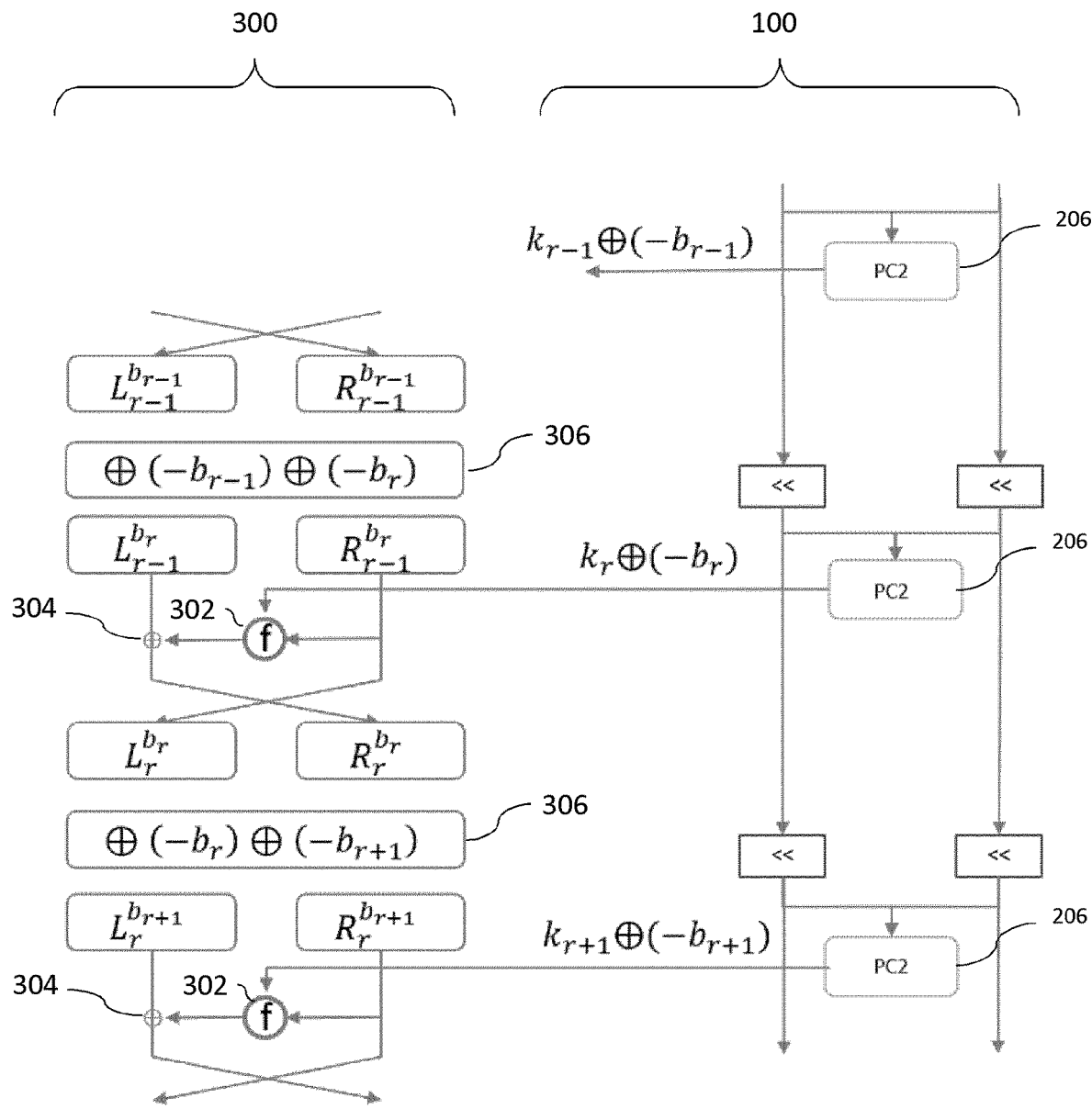

In reference to FIG. 4, in the plurality of encryption rounds 300 each encryption round uses one of the round keys generated during the key schedule.

A masked round key is generated before each encryption round. In particular, as indicated previously, the masked round key $k_r'$ is stored in the first memory registry X before its use during the encryption round of index r, and the following masked round key $k_{r+1}'$ is stored in the same first memory registry X before its use during a following encryption round of index r+1.

Also, the plurality of encryption rounds 300 uses the right registry R and the left registry L.

An encryption round of index r comprises the following sub-steps.

It is assumed that a datum $L_{r-1}^{b_r}$ dependent on the input data block B has been stored in the left registry L. Similarly, a datum noted $R_{r-1}^{b_r}$ also dependent on the data block B has been stored in the right registry R.

The encryption round of index r is applied to the data $L_{r-1}^{b_r}$ and $R_{r-1}^{b_r}$ and also uses the masked round key $k_r'=k_r \oplus (-b_r)$.

The processor 10 applies 302 a predetermined encryption function $f$ to the datum $R_{r-1}^{b_r}$ contained in the right registry R by means of the masked round key $k_r'$ so as to produce an intermediate datum $f(R_{r-1}^{b_r}, k_r')$. The predetermined encryption function $f$ is known per se.

The processor 10 calculates 304 the exclusive disjunction of the intermediate datum and of the datum $L_{r-1}^{b_r}$ contained in the left registry L. The result of this calculation 304 is then stored in the right registry R and is noted $R_r^{b_r}$.

Also, the processor copies the datum $R_{r-1}^{b_r}$ in the left registry L.

On completion of the encryption round of index r this eventually gives:

$$L_r^{b_r} = R_{r-1}^{b_r}$$

$$R_r^{b_r} = L_{r-1}^{b_r} \oplus f(R_{r-1}^{b_r}, k_r \oplus (-b_r))$$

In a conventional DES encryption or decryption method, a following encryption round (of index r+1) would be applied directly to the data $R_r^{b_r}$ and $L_r^{b_r}$.

However, in terms of the present invention and in a non-conventionally manner, the second data $R_r^{b_r}$ and $L_r^{b_r}$ are subject to a correction 306 before their use during the following encryption round of index r+1.

The correction 306 comprises the following calculations:

$$R_r^{b_{r+1}} = R_r^{b_r} \oplus (-b_{r-1}) \oplus (-b_r)$$

$$L_r^{b_{r+1}} = L_r^{b_r} \oplus (-b_{r-1}) \oplus (-b_r)$$

The following encryption round of index r+1 is applied to the two corrected data $R_r^{b_{r+1}}$ and $L_r^{b_{r+1}}$, and also uses the round key $k_{r+1}$. This following round comprises the same steps as those described previously:
- application 302 of the encryption function $f$ to the corrected datum $R_r^{b_{r+1}}$, by means of the masked round key $k_{r+1}' = k_{r+1} \oplus (-b_{r+1})$ so as to produce a new intermediate datum;
- calculation 304 of the exclusive disjunction of the new intermediate datum and of the corrected datum $L_r^{b_{r+1}}$ so as to produce the datum $R_{r+1}^{b_{r+1}}$.

The same steps are performed during each of the n encryption rounds. For each generated round key, the correction 306 is performed between each pair of successive encryption rounds.

Since the DES encryption is symmetrical, a data block is decrypted by means of the same secret key K and the same steps as those of the DES encryption method described previously.

It is observed that during the described encryption method, storing in the first memory registry X of the clear round key $k_r$ executed during an iteration of index r of the key schedule (not being the first iteration) overwrites the masked key $k_{r-1}' = k_{r-1} \oplus (-b_{r-1})$ stored during the preceding iteration of index r−1 of the key schedule.

As the masks $(-b_{r-1})$ and $(b_r)$ are each likely to be either the "all-at-1" mask or the zero mask, four different cases may present:
- $b_{r-1} = 0$ and $b_r = 0$, or
- $b_{r-1} = 1$ and $b_r = 0$, or
- $b_{r-1} = 0$ and $b_r = 1$, or
- $b_{r-1} = 1$ and $b_r = 1$.

In other words, according to the selected masks, the modification of the content of the first memory registry X will be different.

An attacker probing the content of the first registry X is faced with uncertainty preventing him from determining whether the change in value of bit of rank k in the first registry X results from the difference between the bit of rank k of the round key $k_r$ and the round key $k_{r+1}$, or whether it results from the difference between the masks $(-b_{r-1})$ and $(-b_r)$. The attacker therefore cannot deduce information letting him guess the round keys and consequently the secret key K on which they depend, by observing the first registry X.

Also, the correction made between two successive rounds of indices r and r+1 is coherent with the applied values of the masks $(-b_r)$ and $(-b_{r+1})$.

In the embodiment described above, the registry X would serve as transit point for the different round keys generated and may be scrutinized by the attacker. It should be noted however that attacks of the same type may obviously be undertaken even if such a registry X is not being used. The attacker may for example observe signals which transit over conductive wires of the device 1 during execution of the DES encryption/decryption for the same purposes. More generally, the invention lends extra protection to any encryption/decryption algorithm during which at least two round keys are generated successively, a context allowing an attacker to try to go back to the key K by examining the differences between the two successively generated keys.

The invention may further be generalized from other symmetric block encryption/decryption methods, for example the TDES encryption method.

The invention claimed is:

1. A computer-implemented method for encrypting or decrypting an input data block from a secret key, wherein the method comprises steps of:
   generating a first round key $k_r$ dependent on the secret key,
   selecting each of a first mask $(-b_r)$ and a second mask $(-b_{r+1})$ in a set consisting of a mask of bits all at one and a mask of all zero bits,
   calculating a first masked key $k_r'$ from the first round key $k_r$ and the first mask $(-b_r)$ as follows:

$$k_r' = k_r \oplus (-b_r)$$

wherein $\oplus$ is an exclusive disjunction,
   executing a first encryption round applied to two first data dependent on the input data block, by means of the first masked round key $k_r'$ so as to produce two second data $L_r^{b_r}, R_r^{b_r}$,
   after producing the first masked key $k_r'$, generating a second round key $k_{r+1}$ dependent on the secret key,
   calculating a second masked key $k_{r+1}'$ from the second round key $k_{r+1}$ and the second mask $(-b_{r+1})$ as follows:

$$k_{r+1}' = k_{r+1} \oplus (-b_{r+1})$$

calculating two third data $L_r^{b_{r+1}}, R_r^{b_{r+1}}$ as follows $$R_r^{b_{r+1}} = R_r^{b_r} \oplus (-b_{r-1}) \oplus (-b_r)$$

$$L_r^{b_{r+1}} = L_r^{b_r} \oplus (-b_{r-1}) \oplus (-b_r)$$

executing a second encryption round following the first encryption round, wherein the second encryption round is applied to the two third data $L_r^{b_{r+1}}, R_r^{b_{r+1}}$ by means of the second masked round key $k_{r+1}'$, so as to produce two fourth data, generating an output data block dependent on the two fourth data, and storing the output data block in a memory.

2. The method according to claim 1, comprising generating a plurality of round keys, and comprising a plurality of successive encryption rounds, wherein a round key is generated before each encryption round, and wherein:
   for each generated round key,
      a mask associated with the round key is selected, and
      an exclusive disjunction of the round key and of the associated mask is calculated so as to produce a masked key, calculating two third data by means of the masked key is performed between each pair of successive encryption rounds.

3. The method according to claim 2, wherein selecting each mask is performed before the plurality of encryption rounds and/or before the generation of the plurality of round keys.

4. The method according to claim 1, wherein the first mask $(-b_r)$ and the second mask $(-b_{r+1})$ are selected randomly.

5. The method according to claim 1, wherein the mask of bits all at one and the mask of all zero bits are equiprobable.

6. The method according to claim 1, comprising generating a number having a plurality of bits, each round key being associated with one of the bits, and wherein the mask selected to mask a round key is:
the mask of bits all at one if the bit associated with the round key has a first value,
the mask of all zero bits if the bit associated with the round key has a second value different to the first value.

7. The method according to claim 1, wherein the encryption round applied to the two first data comprises:
applying an encryption function to one of the two first data by means of the first masked round key so as to produce an intermediate datum, wherein the first datum also forms one of the two second data,
calculating an exclusive disjunction of the intermediate datum and of the other first datum so as to produce the other second datum.

8. A non-transitory computer-readable medium comprising code instructions for causing a computer to perform a method for encrypting or decrypting a data block from a secret key, wherein the method comprises steps of:
generating a first round key $k_r$ dependent on the secret key,
selecting each of a first mask $(-b_r)$ and a second mask $(-b_{r+1})$ in a set consisting of a mask of bits all at one and a mask of all zero bits,
calculating a first masked key $k_r'$ from the first round key $k_r$ and the first mask $(-b_r)$ as follows:

$$k_r' = k_r \oplus (-b_r)$$

wherein $\oplus$ is an exclusive disjunction,
executing a first encryption round applied to two first data dependent on the data block,
by means of the first masked round key $k_r'$ so as to produce two second data $L_r^{b_r}$, $R_r^{b_r}$,
after producing the first masked key $k_r'$, generating a second round key $k_{r+1}$ dependent on the secret key, calculating a second masked key $k_{r+1}'$ from the second round key $k_{r+1}$ and the second mask $(-b_{r+1})$ as follows:

$$k_{r+1}' = k_{r+1} \oplus (-b_{r+1})$$

calculating two third data $L_r^{b_{r+1}}$, $R_r^{b_{r+1}}$ as follows $$R_r^{b_{r+1}} = R_r^{b_r} \oplus (-b_{r-1}) \oplus (-b_r)$$

$$L_r^{b_{r+1}} = L_r^{b_r} \oplus (-b_{r-1}) \oplus (-b_r)$$

executing a second encryption round following the first encryption round, wherein the second encryption round is applied to the two third data $L_r^{b_{r+1}}$, $R_r^{b_{r+1}}$ by means of the second masked round key $k_{r+1}'$.

9. A device for encryption or decryption of an input data block from a secret key, the device comprising at least one processor configured to:
generate a first round key $k_r$ dependent on the secret key,
select each of a first mask $(-b_r)$ and a second mask $(-b_{r+1})$ in a set consisting of a mask of bits all at one and a mask of all zero bits,
calculate a first masked key $k_r'$ from the first round key $k_r$ and the first mask $(-b_r)$ as follows:

$$k_r' = k_r \oplus (-b_r)$$

wherein $\oplus$ is a XOR operator,
execute an encryption round applied to two first data dependent on the input data block, by means of the first masked round key $k_r'$ so as to produce two second data $L_r^{b_r}$, $R_r^{b_r}$,
after producing the first masked key $k_r'$, generate a second round key $k_{r+1}$ dependent on the secret key,
calculate a second masked key $k_{r+1}'$ from the second round key $k_{r+1}$ and the second mask $(-b_{r+1})$ as follows:

$$k'_{r+1} = k_{r+1} \oplus (-b_{r+1})$$

calculate two third data $L_r^{b_{r+1}}$, $R_r^{b_{r+1}}$ as follows $$R_r^{b_{r+1}} = R_r^{b_r} \oplus (-b_{r-1}) \oplus (-b_r)$$

$$L_r^{b_{r+1}} = L_r^{b_r} \oplus (-b_{r-1}) \oplus (-b_r)$$

execute a following encryption round applied to the two third data $L_r^{b_{r+1}}$, $R_r^{b_{r+1}}$ by means of the second masked round key $(k_{r+1}')$ so as to produce two fourth data, generate an output data block dependent on the two fourth data, and store the output data block in a memory.

10. A smart card comprising an encryption or decryption device according to claim 9.

* * * * *